United States Patent [19]
Rothschild

[11] 3,743,046
[45] July 3, 1973

[54] PASSIVE RESTRAINT FOR VEHICLE PASSENGERS

[76] Inventor: Barbara G. Rothschild, 2134 Springdale Drive, Columbus, Ga. 31906

[22] Filed: July 9, 1971

[21] Appl. No.: 161,180

Related U.S. Application Data

[63] Continuation-in-part of Ser. No. 108,075, Jan. 20, 1971, Pat. No. 3,712,401.

[52] U.S. Cl. ......... 180/82 C, 297/385, 280/150 SB, 180/101
[51] Int. Cl. ............................................ B60r 21/10
[58] Field of Search ................ 280/150 SB; 180/82, 180/101; 297/388, 385

[56] References Cited
UNITED STATES PATENTS

| | | | |
|---|---|---|---|
| 3,190,694 | 6/1965 | Isaac | 297/388 |
| 3,391,961 | 7/1968 | Gardner et al. | 280/150 SB X |
| 3,414,326 | 12/1968 | Raffaelli | 280/150 SB X |
| 3,343,623 | 9/1967 | Porter | 280/150 SB X |
| 3,436,094 | 4/1969 | McKeon | 180/82 X |
| 3,613,819 | 10/1971 | Maloney | 280/150 SB |
| 3,572,832 | 3/1971 | Graham et al. | 297/388 |
| 3,653,714 | 4/1972 | Gentile | 297/388 |

Primary Examiner—Kenneth H. Betts
Attorney—Kimmel, Crowell & Weaver

[57] ABSTRACT

A seat associated belt-type restraint for passenger vehicles stands automatically in an open position. When the passenger places his weight on the seat, a pressure device causes the restraint to fall to the closed or active position. When the vehicle electrical system is energized, the restraint is automatically locked and adjusted to the proper size. When the electrical system is de-energized, the restraint returns automtically to the standing inactive position. No positive steps by the passenger are required to operate the restraint.

11 Claims, 18 Drawing Figures

PATENTED JUL 3 1973 3,743,046

INVENTOR
BARBARA G. ROTHSCHILD

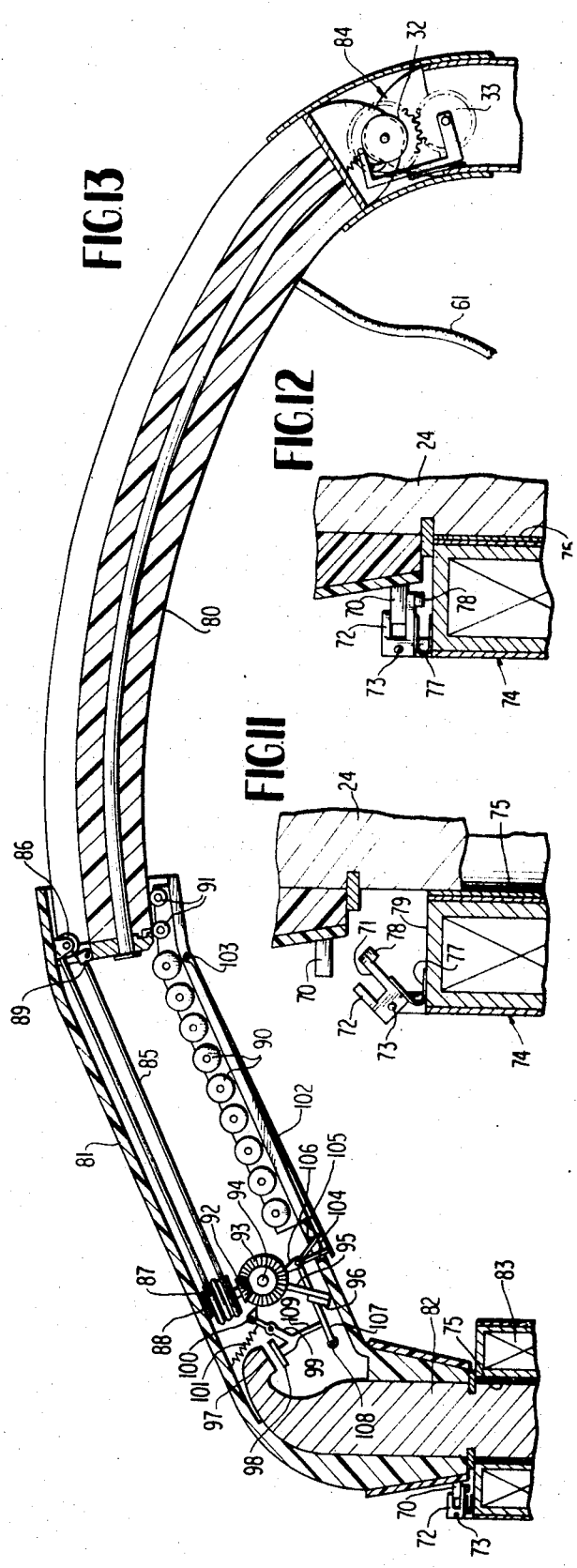

3,743,046

PASSIVE RESTRAINT FOR VEHICLE PASSENGERS

CROSS-REFERENCE TO RELATED APPLICATIONS

This application is a continuation-in-part of prior copending application Ser. No. 108,075, filed Jan. 20, 1971, now U.S. Pat. No. 3,712,401.

BACKGROUND OF THE INVENTION

The invention arises from an ever-increasing need for an effective seat associated restraint for passengers in automobiles and similar vehicles. More particularly, the invention in this application has for its primary objective to satisfy the standards recently issued by the U.S. Department of Transportation for a completely passive restraint, within the meaning of the Occupant Crash Protection Standard, as amended (36 F.R. 4600). According to such standard, the belt type restraint must be completely automatic in operation in that no positive action whatsoever by the vehicle occupants is required to initiate the cycle of peration, beyond the normal entering of the vehicle and driving of the same.

There is much development in the prior art of seat belts and similar restraints which are non-automatic or semiautomatic in operation, but notably absent in the art is the provision of a restraint which need not be touched or manipulated by the occupant in any way to cause closing of the restraint around the occupant, proper adjustment to size, locking and subsequent unlocking and returning of the restraint automatically to the inactive, non-use position. In the present device, the restraint is initially activated from the non-use position toward the active, use position when the occupant or passenger places his or her weight on the associated vehicle seat. The locking of the restraint and the adjustment thereof to fit the individual user is in response to energizing the vehicle electrical system. Unlocking of the restraint takes place automatically when the electrical system is de-energized, and the restraint moves automatically to the non-use position by the action of mechanical means whose stored energy is released by the unlocking of the restraint.

Other features and advantages of the device and its operation will be apparent during the course of the following detailed description.

BRIEF DESCRIPTION OF DRAWING FIGURES

FIGS. 10a through 10f are diagrams showing the operation of a gear shifting cam during opening and closing of the restraint.

FIG. 11 is a side elevation of a locking means for the restraint in the open position.

FIG. 12 is a similar view of the locking means in the closed position.

FIG. 13 is a central longitudinal section through a modified form of restraint embodying the invention.

DETAILED DESCRIPTION

Figure 1:
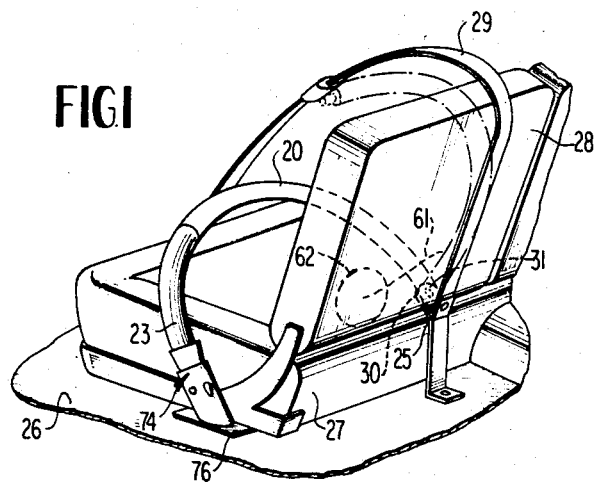
FIG. 1 is a perspective view of a passive restraint for vehicle occupants embodying the present invention.

Referring to the drawings in detail and making reference first to FIGS. 1 through 12, a restraint of the seat belt type comprises an arcuate elongated bar-like body portion 20 of a tough semi-rigid material, preferably reinforced by an internal cable 21 having a rigid head or cap 22 bearing against the forward end of body portion 20. Engageable telescopically over the bar-like body portion 20 is an arcutae sleeve section 23 of similar semi-rigid material and having fixedly mounted in its forward end and projecting therebeyond a locking bolt 24 formed of paramagnetic material. The components 20 and 23 are preferably formed of a nylon-type plastic or equivalent material, whereas the bolt 24 is essentially iron.

The passive restraint embodies a hinge at its end remote from the bolt 24 and this hinge comprises a rigid housing 25 which is firmly anchored to the vehicle floor 26, FIG. 1, at the rear of a vehicle seat 27 having a seat back 28. A flexible shoulder strap or harness 29, forming no part of the present invention, may also be provided as shown in FIG. 1. The hinge housing 25 is shaped to project into the space between the rear edge of the seat 27 and the bottom edge of the seat back 28, this portion of the housing being indicated at 30 in FIG. 1, well out of the way of an occupant using the seat 27.

Figure 5:
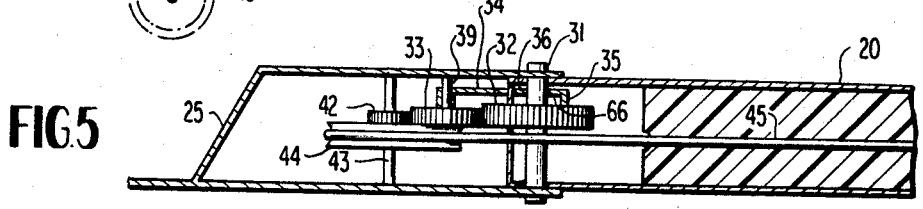
FIG. 5 is a fragmentary cross sectional view taken on line 5—5 of FIG. 2.
Figure 6:
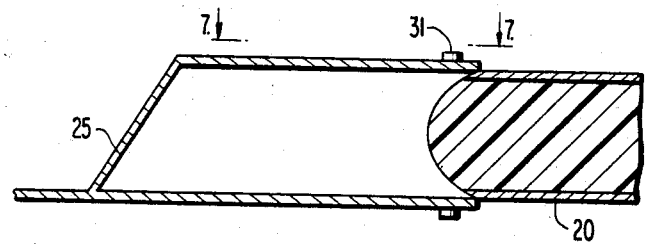
FIG. 6 is a fragmentary side elevation, partly in section, showing the hinge housing and associated elements.
Figure 7:
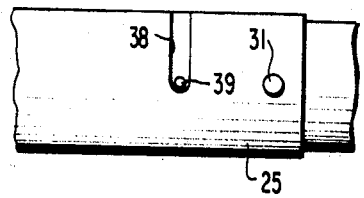
FIG. 7 is a fragmentary elevation taken on line 7—7 of FIG. 6.

The rearward end of the semi-rigid body portion 20 is hingedly secured to the housing 25 through a primary shaft 31 having its ends journaled on the walls of the housing 25, FIG. 5. The shaft 31 carries a spur gear 32 adapted to turn therewith and this gear normally meshes with an intermediate gear 33 which is shiftable and bodily mounted on a shifting yoke 34 having a follower element 35 on its end remote from the gear 33. This follower element coacts with an arcuate cam finger 36 pivoted at 37 to one side of the gear 32 to cause shifting of the gear 33 at required times, as will be further described in connection with FIGS. 10a . . . 10f. A slot 38 in the housing 25 allows the necessary shifting movement of the axle 39 upon which the gear 33 is mounted when shifting occurs. A small spring 40 biases the cam finger normally to the position shown in FIGS. 10a and 10f but this spring yields to allow pivoting of the cam finger under influence of the follower 35.

Figure 4:
FIG. 4 is a similar view of the gearing with an intermediate gear out of mesh.
Figure 4:
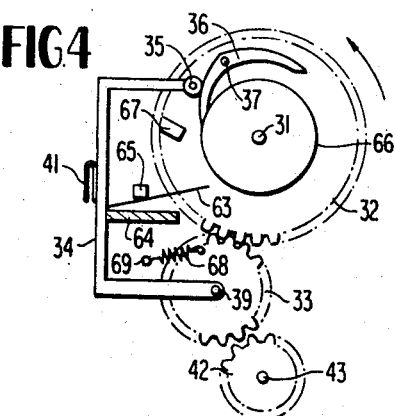
Figure 3:
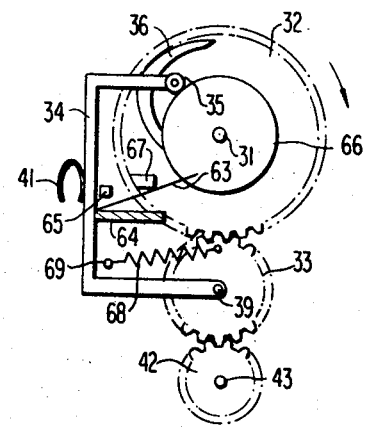
FIG. 3 is a fragmentary elevational view of gearing in the hinge portion of the restraint with the gearing shown in mesh.

The gear shifting yoke 34 is backed up by a leaf spring 41 which urges it normally into a gear meshing position, FIG. 3. This spring also yields to allow the shifting yoke 34 to disengage the intermediate gear 33 from the gear 42, as shown in FIG. 4.

A third gear 42 is arranged to mesh with the shiftable gear 33 and is mounted on a shaft 43 supported by the hinge housing 25 as shown in FIG. 5. Driven by the gear 42 through a friction connection which slips under a predetermined load is a pulley 44 having a flexible cable 45 wound thereon, said cable extending through a groove 46 formed longitudinally in the body portion 20 and being trained about a small sheave 47 at the forward end of the body portion 20, FIG. 2. From this point, the cable 45 extends rearwardly and is anchored at 48 to the rear of sleeve section 23. It may be seen that winding up of the cable 45 by pulley 44 will cause sleeve section 23 to be extended relative to the body portion 20.

Figures 2, 8, 9:
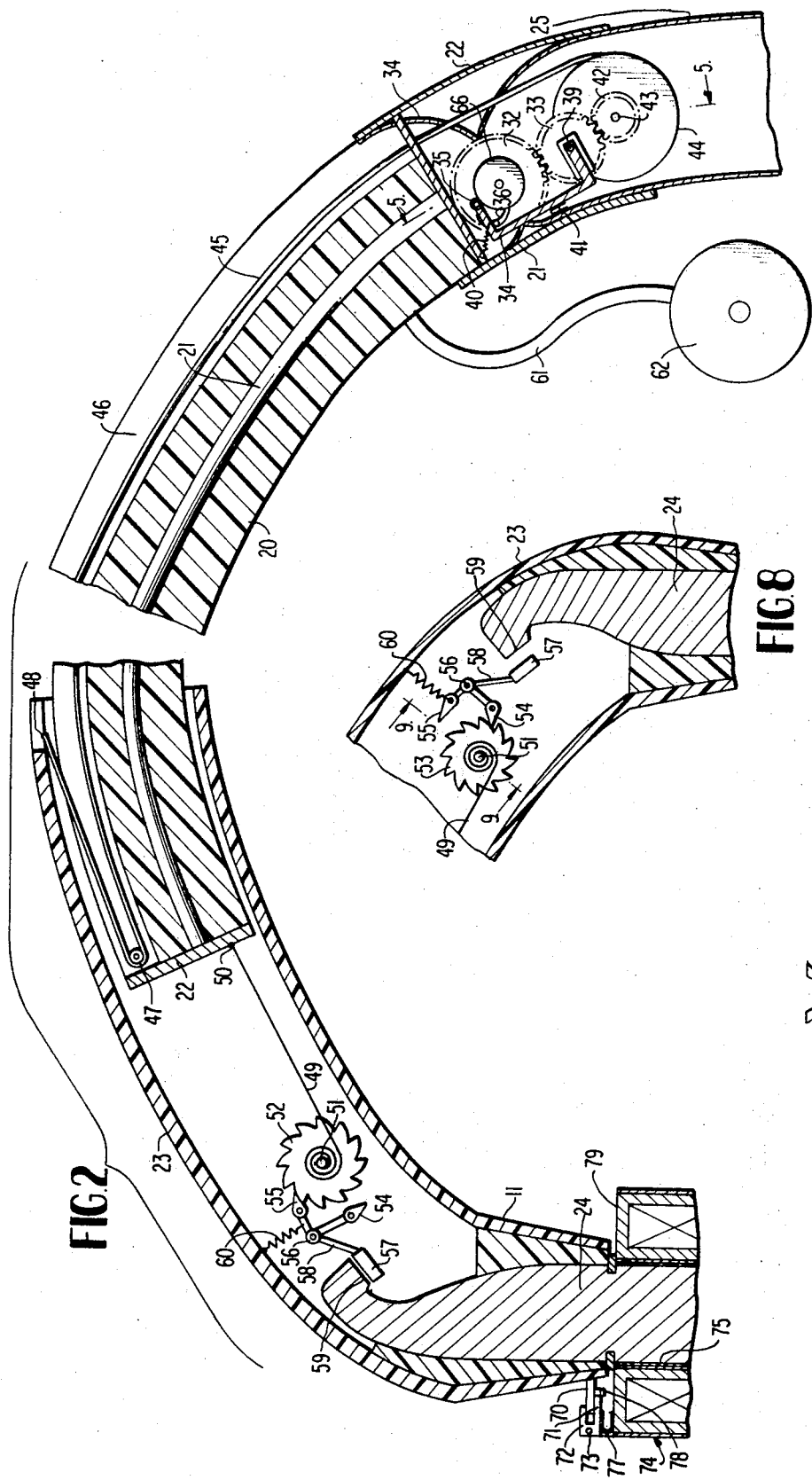
FIG. 2 is a central longitudinal section through the restraint in the active use position.
FIG. 8 is a fragmentary cross section of a pawl and ratchet mechanism.
FIG. 9 is a fragmentary section taken on line 9—9 of FIG. 8.

A clock-type spring 49 has one end attached at 50 to the head or cap 22 and is also secured to a rotary shaft 51 journaled across sleeve section 23 and having ratchet wheels 52 and 53 thereon, FIG. 9. A pair of pawls 54 and 55 spaced apart approximately 90° are mounted on a common rocker shaft 56 in the sleeve section 23. A weighted element 57 of paramagnetic material is connected by an arm 58 with the rocker shaft 56 and when drawn magnetically toward the opposing face 59 of bolt 24 will shift the pawl 55 into engagement with the ratchet wheel 52. When no magnetic field is induced in the bolt 24 and the weight 57 falls away from the face 59, the pawl 55 will disengage ratchet wheel 52 and the companion pawl 54 will engage the ratchet wheel 53, as shown in FIG. 8. The purpose of this function will be further described. If required, the pawls may be further biased by a coil spring 60, which supplements the action of the weight 57. It may be seen that when the sleeve section 23 is extended by the action of the cable 45 during the closing of the restraint, energy is stored in the coil spring 49 for subsequent use in adjusting or tightening the restraint about the occupant, as will be further described.

To initiate the movement of the restraint from its normal standing open or non-use position toward its closed position a flexible element 61 is attached firmly to the body portion 20 at a point near the back of the seat and the remote end of this flexible element is attached to a disc or plate 62 wich is concealed beneath the upholstery of the seat 27. When an occupant sits on the seat, pressure is applied to the plate 62 and the flexible element 61 is tensioned and swings the restraint toward the closed position shown in full lines in FIG. 1.

In order to assure that the restraint will return automatically to the open non-use position after being unlocked by de-energizing the vehicle electrical system, means are provided to store energy in the gearing at the hinged end of the restraint during the closing movement of the same. Referring particularly to FIGS. 3 and 4, when the restraint is moving to the closed position, the follower 35 rides up onto and over the cam finger 36, FIG. 4, and in so doing causes the shifter yoke 34 to move to the left, compressing leaf spring 41, and disengaging the gear 33 from the other two gears, as shown. As this occurs, a leaf spring 63 is compressed between a base 64 and a stop element 65 attached to the top of the hinge housing 25. At the end of the closing movement of the restraint, FIG. 10f, the follower 35 moves back against the periphery of a guide disc 66 attached to one side of the drive gear 32, and the compressed spring 63 is ready to unleash its energy against a stop element 67 carried by the gear 32, see FIGS. 3 and 4. This energy will drive the gear 32 in a clockwise direction shown by the arrow in FIG. 3 to cause opening of the restraint, the gear 33 now having become reengaged with the other gears. To provide additional energy for automatically opening the belt-type restraint, an additional spring 68 may be provided with one end thereof attached to the intermediate gear 33 and its opposite end attached to a fixed lug 69 similar to the element 65. If necessary, a pair of leaf springs 63 may be utilized, one on each side of the gear 32, to provide the necessary energy.

Referring to FIGS. 11 and 12, a latching means is provided to keep the restraint closed during the brief period following the seating of the occupant and the turning on of the ignition system which results in the complete locking and adjustment of the restraint. This latching means comprises a rigid lug 70 on the leading end of sleeve section 23, adapted to engage the lower arm 71 of a U-shaped latch having a foreshortened upper arm 72, the latch being pivoted at 73 on the structure of an electromagnet 74 having a socket 75 adapted to receive the paramagnetic bolt or plunger 24. As best shown in FIG. 1, the support structure for the electromagnet 74 is firmly anchored by a foot plate 76 to the floor 26 of the vehicle. The pivoted latch including arms 71 and 72 is urged to a normal inactive or open position, FIG. 11, by a leaf spring 77 attached to the electromagnet structure on one side of the socket bore 75. A small paramagnetic element 78 is carried by the lower arm 71 and positioned to be attracted to the top face 79 of the electromagnet 74 at the proper time.

As shown in FIG. 12, when the restraint closes due to an occupant placing his weight on the seat 27 and prior to activating the ignition circuit, the descending lug 70 will strike the projecting lower arm 71 of the latch after passing the shorter arm 72 and the pivoted latch will move to the closed position, FIG. 12, where the upper arm 72 is now above the lug 70 to prevent upward movement of the restraint prior to activating the ignition circuit. The spring 77 is now compressed. When the ignition circuit is closed, the paramagnetic bolt 24 is magnetically locked within the socket 75 and this provides a primary securing means for the restraint until the ignition circuit is de-activated. At this time, the element 78 will also be attracted to the top face of the electromagnet, as stated. When the ignition circuit is de-energized, stored energy in the spring 77 will provide the initial action in returning the restraint automatically to the open position, the main power for this coming from the springs 63 and 68 associated with the gearing at the hinged end of the restraint. In some cases, alternate forms of power may be utilized to open the restraint automatically when the ignition circuit is de-energized, hydraulic means could be employed or some pneumatic means, if preferred. The pivoted latch including arms 71 and 72 is stabilized mechanically in both the open and closed positions by a conventional wedge-type catch, not shown, on the pivot 73 which will release under pressure.

Returning to the diagrams, FIGS. 10a . . . 10f, these simply show the operation of the arcuate cam finger 36 and follower 35 in causing shifting of the intermediate gear 33 into and out of mesh with the gears 32 and 42, FIGS. 3 and 4, during the opening and closing of the restraint. In the opening cycle, FIGS. 10a through 10c, it is seen that the follower element 35 remains on the periphery of the disc 66 and passes under the pivoted cam finger 36 as the gear 32 turns in the clockwise direction, responsive to the power of the springs 63 and 68, FIG. 3. The intermediate gear 33 remains engaged during this automatic opening of the restraint.

The restraint closing cycle is shown in FIGS. 10d through 10f and in FIG. 4. The gear 32 turns counterclockwise as the restraint is pulled downwardly by the flexible element 61 responding to weight on the seat 27. The biased cam finger 36, FIG. 10d, passes under the follower 35 and raises the same from the periphery of guide disc 66 and this causes the yoke 34 to shift the intermediate gear 33 out of mesh with the other gears during the restraint closing cycle. By the end of this cycle, FIG. 10f, the follower 35 has passed over the cam finger 36 and has moved back into contact with the periphery of disc 66 and the three gears 32, 33 and 42 are now again in mesh ready to coact in the next opening cycle of the restraint. It is desired to emphasize that all of this operation takes place automatically without any action on the part of the occupant or passenger in the vehicle.

Returning to the operation of the spring 49 and associated parts in FIG. 2, the purpose of this spring is to accomplish the automatic adjustment of the length of the restraint to the size of a particular occupant when the vehicle electrical circuit is energized. The spring 49 is later tensioned for re-use during the opening movement of the restraint by the action of the gears 32, 33 and 42 which cause winding of the cable 45 on the drum 44 and consequent extension of the sleeve section 23 relative to the body portion 20, as previously explained. At the point of maximum extension of these parts, the cable attachment point 48 will be approximately adjacent to the sheave 47 in FIG. 2. FIG. 2 shows the parts in an intermediate adjusted position.

The restraint always moves through the same arc when changing from the closed to the open position, but the calbe 45 needs to be wound up varying amounts depending upon the previous adjustment of the restraint to a particular occupant caused by the release of energy in the spring 49 which retracts or telescopes the elements 23 and 20 the required amount. For this reason, the cable winding drum 44 has a friction connection with the gear 42. After the cable is wound taut and the gear 42 continues to turn, the drum 44 will merely slip.

Additionally, while it is desired to wind up the cable 45 during opening of the restraint, it is not desirable to unwind the cable when the restraint is moving to the closed position. It is also important that the restraint be extended to the maximum amount during closing to avoid contact with the body of the occupant which might stop the closing movement prematurely. Firm adjustment of the restraint around the waist of the occupant due to the action of the spring 49 occurs after the restraint is fully closed and locked into place, as previously explained. To prevent unwinding of the cable 45 during the closing cycle, the described arrangement for disengaging the gears, FIGS. 4 and 10d through 10f, is provided in the system.

When the restraint is fully closed and locked by the electromagnet 74 and the latching means 71-72, as fully described previously, the weight 57 is magnetically attracted to the face 59 of paramagnetic bolt 24 and this causes the pawl 54, FIG. 2, to disengage the ratchet gear 53 and release the energy of spring 49 for drawing the parts 23 and 20 into snug engagement with the occupant. This is the automatic adjustment of the restraint after it is fully closed and locked into place. To prevent the restraint from slipping or becoming enlarged in the case of an accident, the pawl 55 and ratchet wheel 52, FIG. 2, are provided. The additional ratchet wheel 53, FIG. 8, and its coating pawl 54, prevent the adjusting spring 49 from winding up when the restraint is in the open position and the vehicle ignition circuit is de-energized and the weight 57 has fallen away from the face 59. The teeth of the two ratchet wheels 52 and 53 face in the opposite directions to facilitate the necessary action. The falling away of the weight 57 from the face 59 raises the pawl 54 into engagement with the ratchet wheel 53. The overall cycle of operation may be summarized briefly as follows. When the vehicle is standing idle with its electrical system de-energized, the restraint will be standing in the open inactive position shown in dotted lines in FIG. 1. When an occupant enters the vehicle, and seats himself on the seat 27 and tensions the flexible element 61, the restraint will move automatically to the closed position and will be in the maximum extended size which was attained by the action of the gearing 32, 33 and 42 on the preceding opening cycle. When the restraint is fully closed, the mechanical latch including arms 71 and 72 will be activated automatically by the lug 70 and this will hold the restraint during the brief interval until the ignition circuit is energized. When energized, the restraint will be firmly locked by magnetism acting on the bolt 24. Immediately following this, the magnetic attraction on the weight 57 will free the ratchet wheel holding the spring 49 and release the energy in this spring to effect the necessary degree of retraction and adjustment of the restraint automatically and the safe holding of the restraint in the adjusted condition depending upon the size of the particular occupant. When the vehicle is stopped and the ignition circuit turned off, the bolt 24 is instantly released and the power provided on the gears 32 and 33 by the spring means 63 and 68 will be sufficient to automatically raise the restraint to the open position as the occupant leaves the vehicle and relieves the seat 27 of his or her weight. During the automatic opening movement of the restraint, the cable 45 will wind-up on the drum 44 and the elements 20 and 23 will be extended the maximum amount and this condition will prevail until the restraint is again fully closed by the next occupant seating himself or herself in the vehicle.

Referring to FIG. 13 of the drawings, a modification is shown wherein the spring 49 and associated elements for adjusting the restraint is eliminated and replaced by a device which adjusts the restraint automatically by magnetism when the ignition circuit is energized. This magnetic adjustment means is shown in FIG. 13 and may be identical to the means shown in FIGS. 4 through 6 of the above-referenced prior copending application Ser. No. 108,075. Therefore, the magnetic adjusting means need only be briefly described in connection with FIG. 13. In this figure, the restraint comprises a semi-rigid body portion 80 essentially identical with the body portion 20 and a telescoping relatively movable sleeve portion 81 similar to the sleeve portion 23. A paramagnetic bolt 82 is provided in the same manner as the bolt 24 and a stationary electromagnet 83 receives this bolt and locks the same in place as described in the previous embodiment when the ignition circuit is energized, it being understood in both embodiments that the coil of the electromagnet 83 is suitably electrically connected into the ignition circuit.

The hinge and supporting structure 84 for the modified restraint in FIG. 13 is essentially identical to that of the preceding embodiment except that the third gear 42 and associated drum 44 and cable 45 are eliminated since these are not needed in the modified form. One advantage of the modified form is that less power is required to open the restraint. The spring-loaded gears 32 and 33 function in the identical manner previously described to cause automatic opening of the restraint. The closing movemement is initiated by the flexible element 61, as previously described, when an occupant enters the vehicle and sits on the seat.

The magnetically operated restraint adjusting means comprises a cable 85 which is endless. This cable engages a sheave 86 carried by the sleeve section 81 and also engages a compound pulley 87 mounted on a stub shaft 88 depending from the wall of sleeve section 81. The calbe 85 is also anchored by a clamp 89 to the leading end of body portion 80, whereby movement of the cable will cause relative telescoping movement of the parts 80 and 81. The lower side of sleeve section 81 is equipped with low friction guide rolls 90 and 91 to facilitate the smooth extension and retraction of sleeve section 81. The stub shaft 88 carries a bevel gear 92 on its lower end meshing with another bevel gear 93 on a transverse axle 94 in the sleeve section 81. The axle 94 carries a radial arm 95 rigid therewith, in turn carrying a magnetically attractable weight 96 adapted to be drawn into contact with the face 97 of bolt 82 when the electromagnet 83 is energized. When the ignition circuit is turned on, energizing the electromagnet 83, the restraint is locked into place, as in the previous embodiment, and the movement of the element 96 toward the face 97 drives the gears 93 and 92 and the cable 85 to cause automatic adjustment of the restraint or belt about the body of the occupant or passenger.

As fully disclosed in said prior application, the gear 93 has ratchet teeth on the reverse side thereof and a magnetically attractable weight member 98 is fixed on a rocker arm 99 carrying a pawl 100 which engages the ratchet wheel, not shown, when the weight 98 is drawn toward the face 97. This prevents accidental loosening of the restraint in an accident or under impact. This condition prevails as long as the ignition system is energized. The locking pawl 100 is otherwise held in the inactive position shown in FIG. 13 by gravitational force on the weight 98 aided by the force of a retractile spring 101.

Excessive tightening of the restraint is also prevented by the ratchet means on the remote side of gear 93. A leaf spring sensor 102 on the lower side of sleeve section 81 and secured thereto at 103 carries a push rod 104 at its free end having a wedge spring 105 which projects through a side opening in the sleeve section 81. A second pawl 106 is secured to the push rod 104 as is an operating rod 107 which has its outer end pivoted to a cross shaft 108 in the sleeve section 81. When the restraint tightens around the occupant to such an extent that the sensor element 102 is pushed upward by contact with the body, the second pawl 106 is forced into position to lock the ratchet wheel and the gear 93 against further rotation and this limits the tightening operation. Wedge spring 105 prevents accidental withdrawal of the pawl 106, such as where the occupant inhales air and thereby changes his size at the waist. Disengagement of the second pawl is accomplished upon de-energizing of the electrical system by mechanical means in the form of a rod 109 secured to the rocker arm 99 and aligned with the operating rod 107. When the arm 99 is released from magnetic attraction, the spring 101 moves the extension 109 against the rod 107, thereby disengaging the pawl 106 from the ratchet wheel on the reverse side of the gear 93. All of this construction and its operation is shown in greater detail in said prior copending application referenced herein.

The overall mode of operation of the device in FIG. 13 is basically the same as in the prior embodiment. When the occupant sits upon the seat, the normally standing or open restraint in the fully extended position will close around the occupant and will automatically lock magnetically when the ignition is turn on. At the same time, the restraint adjusts itself properly to fit the size of the occupant by the magnetically operated means above described including the attractable weight 96, bevel gears and the cable 85 and associated parts. The described pawl and ratchet means eliminate overtightening of the restraint or accidental expansion thereof in an accident. When the electrical system is de-energized, the restraint is released and the spring-loaded gearing 84 will automatically return the restraint to a free standing inactive position exactly as described in the prior embodiment as the occupant leaves the seat. Also, when the system is de-energized, the weight 96 acting on the gears 93 and 92 will cause relative movement between the parts 80 and 81 to assure that the restraint is fully extended during the next closing cycle. As in the prior embodiment of the invention, a completely passive restraint is provided, requiring no action by the occupant beyond what is required to normally enter the vehicle and drive it.

It is to be understood that the forms of the invention herewith shown and described are to be taken as preferred examples of the same, and that various changes in the shape, size and arrangement of parts may be resorted to, without departing from the spirit of the invention or scope of the subjoined claims.

I claim:

1. A passive restraint for vehicle passengers comprising a pair of interfitting restraint sections capable of relative longitudinal movement to adjust the length of the restraint, hinge means hingedly anchoring one end of one restraint section to vehicle fixed structure, means connected with one restraint section and responding to weight of a passenger on a vehicle seat to initiate movement of the restraint in a first direction about said hinge means from a normally open standing position to a locked closed active position about a passenger, energy storing means responsive to movement of the restraint in said first direction to store energy that is released to apply power to move the restraint in a second direction about said hinge means from said closed position to said open position pursuant to unlocking of the restraint in said closed position, and means on one restraint section operable to releasably lock the restraint in said closed position and to automatically adjust the length of the restraint to fit a particular passenger by causing said relative longitudinal movement of the restraint sections after the restraint is closed and locked.

2. The structure of claim 1, and said pair of interfitting restraint sections comprising a semi-rigid bar-like body portion, and a sleeve section having telescopic engagement with the bar-like body portion and being extensible and retractable relative thereto.

3. The structure of claim 2, and said energy storing means including a rotary drum element, and a flexible element attached to the drum element and being windable thereon and having connections with the bar-like body portion and sleeve section to cause relative longitudinal movement therebetween during movement of the restraint in said second direction.

4. The structure of claim 3, and said energy storing means including gearing interconnecting the bar-like body portion and said drum element, said gearing including a shiftable gear and means responding to said movement of the restraint in said first direction to disengage the shiftable gear from adjacent gears of said gearing.

5. The structure of claim 1, and said means responding to the weight of a passenger comprising a flexible element attached to the restraint and including a pressure sensing element associated with said seat and responding to weight on the seat to tension said flexible element.

6. The structure of claim 1, and said means operable to lock the restraint in a closed position and to automatically adjust the length of the restraint including parts responding to magnetism induced by the energizing of a vehicle electrical system.

7. The structure of claim 6, and said parts responding to magnetism comprising a magnetically attractable locking bolt on one restraint section, and a separate movable magnetically attractable weight element on the restraint cooperating with said bolt to initiate the operation of means to adjust the length of the restraint to fit the particular passenger who is using the restraint.

8. The structure of claim 7, and said means to adjust the length of the restraint including a power spring having connections with said interfitting restraint sections.

9. The structure of claim 7, and said means to adjust the length of the restraint comprising a magnetically attractable weight element, gearing connected with and driven by movement of the weight element, and a flexible driving element connected with the gearing and interconnecting the interfitting restraint sections, whereby movement of the flexible driving element in one direction will cause said relative longitudinal movement of the restraint sections.

10. The structure of claim 1, and said means to releasably lock the restraint comprising electromagnetic locking means energized by closing of the ignition circuit of the vehicle, and a separate latching device for the restraint activated by the closing thereof and securing the restraint against opening during the short interval between closing of the restraint and energizing of the electromagnetic locking means.

11. The structure of claim 1, and said energy storing means including a gear train having one gear shiftable into and out of mesh with adjacent gears and having at least one gear which is spring-loaded by turning in one direction for storing energy to return said restraint automatically to a normal open standing position, and camming means connected with the shiftable gear operable to disengage it from adjacent gears when the gear train is powered in one direction due to movement of the restraint in said first direction.

* * * * *